(12) United States Patent
Prasad

(10) Patent No.: US 9,733,782 B2
(45) Date of Patent: Aug. 15, 2017

(54) EXTRACTING A DETERMINISTIC FINITE-STATE MACHINE MODEL OF A GUI BASED APPLICATION

(71) Applicant: FUJITSU LIMITED, Kawasaki-shi, Kanagawa (JP)

(72) Inventor: Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 556 days.

(21) Appl. No.: 14/027,017

(22) Filed: Sep. 13, 2013

(65) Prior Publication Data

US 2015/0082207 A1 Mar. 19, 2015

(51) Int. Cl.
 *G06F 9/44* (2006.01)
 *G06F 3/048* (2013.01)
 *G06F 11/36* (2006.01)

(52) U.S. Cl.
 CPC .......... *G06F 3/048* (2013.01); *G06F 11/3672* (2013.01); *G06F 11/3696* (2013.01)

(58) Field of Classification Search
 CPC .. G06F 3/048; G06F 11/3672; G06F 11/3696; G06F 9/444
 USPC ........................................................ 717/125
 See application file for complete search history.

(56) References Cited

U.S. PATENT DOCUMENTS

| | | | | |
|---|---|---|---|---|
| 7,668,796 B2 * | 2/2010 | Hinchey | ................... | G06N 5/04 706/48 |
| 9,020,873 B1 * | 4/2015 | Duffy | ..................... | G06F 9/444 705/4 |
| 2003/0135533 A1 * | 7/2003 | Cook | ........................ | G06F 8/34 718/1 |
| 2007/0162410 A1 * | 7/2007 | Hinchey | ................... | G06N 5/04 706/48 |
| 2008/0270101 A1 * | 10/2008 | Salmela | ..................... | G06F 8/10 703/17 |
| 2010/0011057 A1 * | 1/2010 | Ganai | .................... | G06F 9/5066 709/203 |
| 2010/0088668 A1 * | 4/2010 | Yoshihama | ............... | G06F 8/10 717/105 |
| 2011/0078556 A1 * | 3/2011 | Prasad | ...................... | G06F 8/10 715/234 |
| 2015/0082207 A1 * | 3/2015 | Prasad | ...................... | G06F 8/34 715/762 |
| 2015/0286355 A1 * | 10/2015 | Prasad | ................ | G06F 11/3668 715/763 |

OTHER PUBLICATIONS

Angluin "Learning regular sets from queries and counterexamples" Department of Commuter Science, Yale University, Information and Computation 75, 87-106, Nov. 1, 1987.

(Continued)

*Primary Examiner* — Marina Lee
(74) *Attorney, Agent, or Firm* — Maschoff Brennan

(57) ABSTRACT

A method of modeling a graphical user interface (GUI) based application as a deterministic finite-state machine may include generating dummy error state and a dummy error output in a finite-state machine. The method may further include modeling a response to an action that is unavailable on a screen of a graphical user interface (GUI) based application as a transition to the dummy error state in the finite-state machine while producing the dummy error output in the finite-state machine.

21 Claims, 8 Drawing Sheets

(56) References Cited

OTHER PUBLICATIONS

Shahbaz et al., "Inferring Mealy Machines" Lecture Notes in Computer Science vol. 5850, Nov. 2009, pp. 207-222.
Cho et al., "MACE: Model-inference-Assisted Concolic Exploration for Protocol and Vulnerability Discovery" USENIX Security Symposium (2011).
Mirzaei et al., "Testing Android Apps Through Symbolic Execution" p. 1-5, Nov. 2012 vol. 37 No. 6.
Howar et al., Hybrid Learning: Interface Generation through Static, Dynamic, and Symbolic Analysis Proceedings of the International Symposium on Software Testing and Analysis, pp. 268-279, Jun. 2013.
Giannakopoulou et al., "Symbolic Learning of Component Interfaces" Lecture Notes in Computer Science vol. 7460, Sep. 2012, pp. 248-264.
Botinčan et al., "Sigma*: Symbolic Learning of Input-Output Specifications" ACM SIGPLAN Notices—POPL '13 vol. 48 Issue 1, Jan. 2013 pp. 443-456.

* cited by examiner

EXTRACTING A DETERMINISTIC FINITE-STATE MACHINE MODEL OF A GUI BASED APPLICATION

FIELD

The embodiments discussed herein are related to extracting a deterministic finite-state machine (DFSM) model of a graphical user interface (GUI) based application.

BACKGROUND

Graphical user interface (GUI) based applications for electronic devices, such as mobile applications for mobile devices, are becoming increasingly common. Many GUI applications execute operations based on actions performed on a graphical user interface via a touchscreen, which may ease use of the GUI applications. However, the GUI and touchscreen interface of the GUI applications also provide challenges in assessing the behavior of the GUI applications.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of modeling a graphical user interface (GUI) based application as a deterministic finite-state machine may include generating dummy error state and a dummy error output in a finite-state machine. The method may further include modeling a response to an action that is unavailable on a screen of a graphical user interface (GUI) based application as a transition to the dummy error state in the finite-state machine while producing the dummy error output in the finite-state machine.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

As discussed in further detail below, some embodiments of the present disclosure may include an analysis module that generates a deterministic finite-state machine model (referred to hereinafter as a "DFSM model") such as a Mealy Machine model of a graphical user interface (GUI) based application (referred to hereinafter as a "GUI application"). The DFSM model may indicate the behavior of the GUI application. In some embodiments, the DFSM model may be used during development and testing of the GUI application. In such instances, the DFSM model may be used to determine whether or not the GUI application includes the functionality and features as expected or desired by the developer of the GUI application. The DFSM model may thus be used to identify one or more features of the GUI application that may not function as desired and that may accordingly be modified such that the GUI application functions as desired. Therefore, a design of the GUI application may be modified based on the DFSM model to aid in model-driven development (MDD) and model-based testing (MBT) of the GUI application.

Embodiments of the present disclosure are explained with reference to the accompanying drawings.

Figure 1:
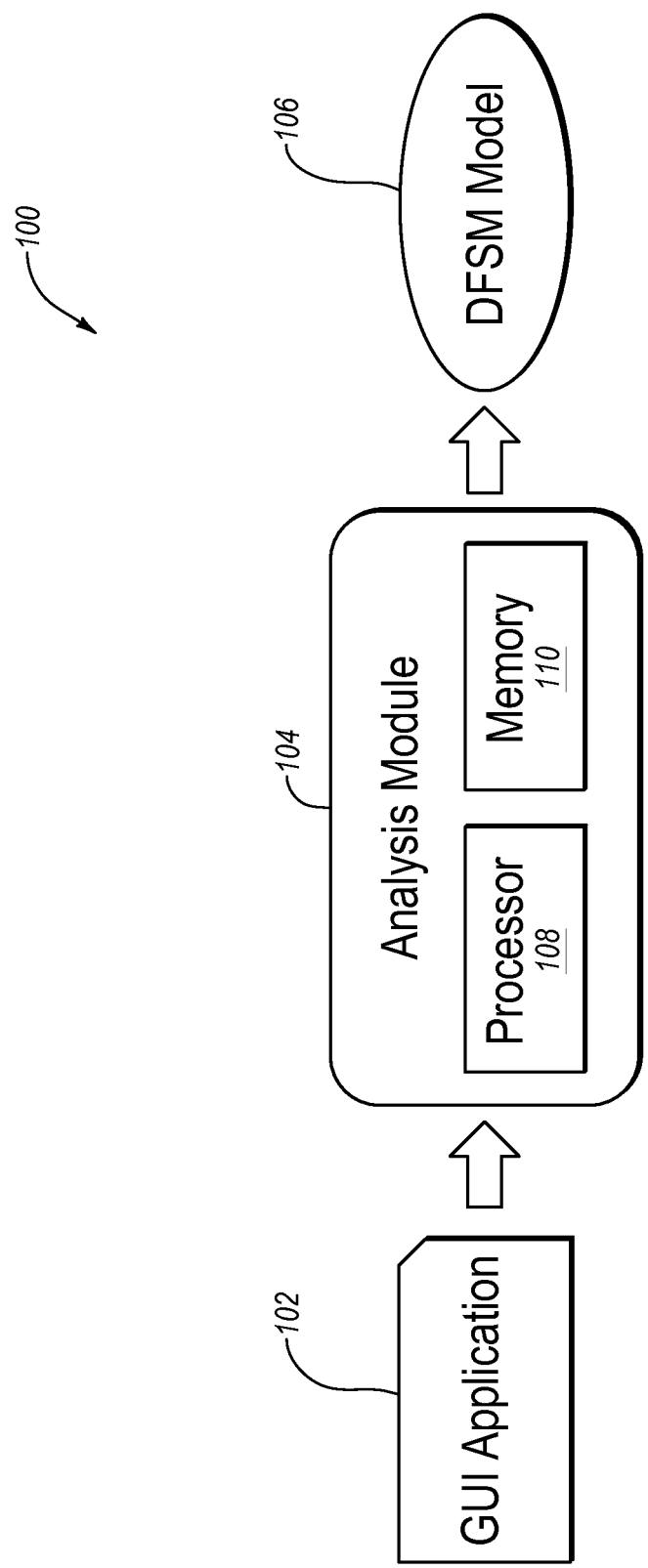
FIG. 1 illustrates an example system of generating a deterministic finite-state machine (DFSM) model of a GUI application.

FIG. 1 illustrates an example system 100 of generating a DFSM model of a GUI application 102, arranged in accordance with at least one embodiment of the present disclosure.

The GUI application 102 may be any suitable GUI application that may be included on an electronic device. The electronic device may include, but is not limited to, a tablet computer, a smartphone, a navigation system, an entertainment system, a desktop computer, a laptop computer, a digital music player, etc.

The GUI application 102 may include one or more distinct GUI components, each associated with a particular view of the GUI application 102 (referred to hereinafter as "views") that may be executed in a mutually exclusive fashion and that may each be associated with at least some of the operations performed by the GUI application 102. Examples of views of a GUI application are illustrated below in FIG. 2A.

Each view of the GUI application 102 may be associated with one or more distinct screens, where each screen may support at least a portion of the operations of the GUI application 102 as well as represent the response of the GUI application 102 to one or more user actions on a screen. To support at least a portion of the operations of the GUI application 102, each screen may include one or more widgets. Each widget may be configured to execute one or more of the operations of the GUI application 102 based on one or more actions performed by a user with respect to the widget. For example, a widget may be displayed as a button on the GUI of the GUI application 102 and may be configured to execute a first operation based on a tap of the widget via a touchscreen of a mobile device. The same widget may be configured to execute a second operation based on a long tap or some other action performed on the widget via the touchscreen. Additionally, in some instances an entire screen may be configured as a widget. For example, a swipe of a screen may cause the GUI application 102 to transition to another screen. Example screens of views of a GUI application are also illustrated below in FIG. 2A.

Each screen may additionally be associated with one or more states of the GUI application 102. In some embodiments, the state of the GUI application 102 associated with a screen may be based on the state of the one or more widgets associated with the screen. The state of a widget may be represented by the values of one more attributes describing the widget. For example, different states of a widget may be based on whether the widget is enabled or disabled, visible or not visible, opaque or not opaque, etc. Therefore, the GUI application 102 may include multiple states associated with a particular screen based on the number of states of widgets that may be associated with the screen.

The state of the GUI application 102 associated with a screen may also be based on previous states or screens that were reached prior to reaching the screen. For example, a particular screen may be reached from a first previous screen and a second previous screen. Accordingly, the GUI application 102 may include a state associated with the particular screen that is related to reaching the particular screen from the first previous screen and may include another state associated with the particular screen that is related to reaching the particular screen from the second previous screen. As discussed in further detail below, the outputs of actions performed on screens of the GUI application 102 may be associated with different states of the GUI application 102.

As mentioned above, FIG. 2A illustrates example views and screens of a tipping GUI application 202 (referred to hereinafter as "tipping application 202") configured to determine a tip for a bill, arranged in accordance with at least some embodiments described herein. The tipping application 202 may include a bill-input view 204 that may be associated with entering an amount of the bill. A settings view 206 of the tipping application 202 may be associated with changing settings of the tipping application 202. The tipping application 202 may also include a tip-total view 208 that may be associated with displaying an amount of the tip.

The tipping application 202 may also include screens that may be associated with the views 204, 206, and 208. For example, the tipping application 202 may include a bill-input screen 210 that may be associated with the bill-input view 204, a settings screen 212 that may be associated with the settings view 206, and a tip-total screen 214 that may be associated with the tip-total view 208.

In the illustrated embodiment, the bill-input screen 210 may include one or more widgets associated with operations and/or commands that may be performed on the bill-input screen 210. For example, the bill-input screen 210 may include an input widget 216 configured to allow a user to enter a bill amount. The bill-input screen 210 may also include a calculate widget 218 configured such that when a user taps an associated "Calculate" button, the GUI application 202 transitions to the tip-total screen 214 and tip-total view 208. The bill-input screen 210 may additionally include a settings widget 220 configured such that when the user taps an associated "Settings" button, the tipping application 202 transitions to the settings screen 212 and settings view 206.

The tip-total screen 214 may also include widgets that may be associated with operations and/or commands that may be performed on the tip-total screen 214. In the illustrated embodiment, the tip-total screen 214 may include a settings widget 222 similar to the settings widget 220 of the bill-input screen 210 configured such that when the user taps an associated "Settings" button, the tipping application 202 transitions from the tip-total screen 214 and tip-total view 208 to the settings screen 212 and settings view 206. The tip-total screen 214 may also include a back widget 224 configured such that when an associated "Back" button is tapped, the tipping application 202 may transition to a previous screen with which an action other than "Back" was performed to reach the current screen. For example, in the illustrated embodiment, the tip-total screen 214 may be reached by tapping the "Calculate" button associated with the calculate widget 218 in the bill-input screen 210. Accordingly, tapping the "Back" button associated with the back widget 224 may cause the tipping application 202 to return to the bill-input screen 210.

The settings screen 212 may also include widgets that may be associated with operations and/or commands that may be performed on the settings screen 212. For example, in the illustrated embodiment, the settings screen 212 may include a tax rate widget 226 that may be configured to toggle "checking" an associated box in response to the user tapping the box. When the box is checked, the tax rate may be excluded from the calculated tip and when the box is unchecked, the tax rate may be included in the calculated tip.

The settings screen 212 may also include a back widget 228 similar to the back widget 224 and configured such that when an associated "Back" button is tapped, the tipping application 202 may transition to a previous screen with which an action other than "Back" was performed to reach the current screen. For example, in the illustrated embodiment, the settings screen 212 may be reached by tapping the "Settings" button associated with the settings widget 220 in the bill-input screen 210. Accordingly, tapping the "Back" button associated with the back widget 228 may cause the tipping application 202 to return to the bill-input screen 210 when the "Settings" button associated with the settings widget 220 in the bill-input screen 210 is tapped. Additionally, the settings screen 212 may be reached by tapping the "Settings" button associated with the settings widget 222 in the tip-total screen 214. Accordingly, tapping the "Back" button associated with the back widget 228 may cause the tipping application 202 to return to the tip-total screen 214 when the "Settings" button associated with the settings widget 222 in the tip-total screen 214 is tapped.

Figure 2A:
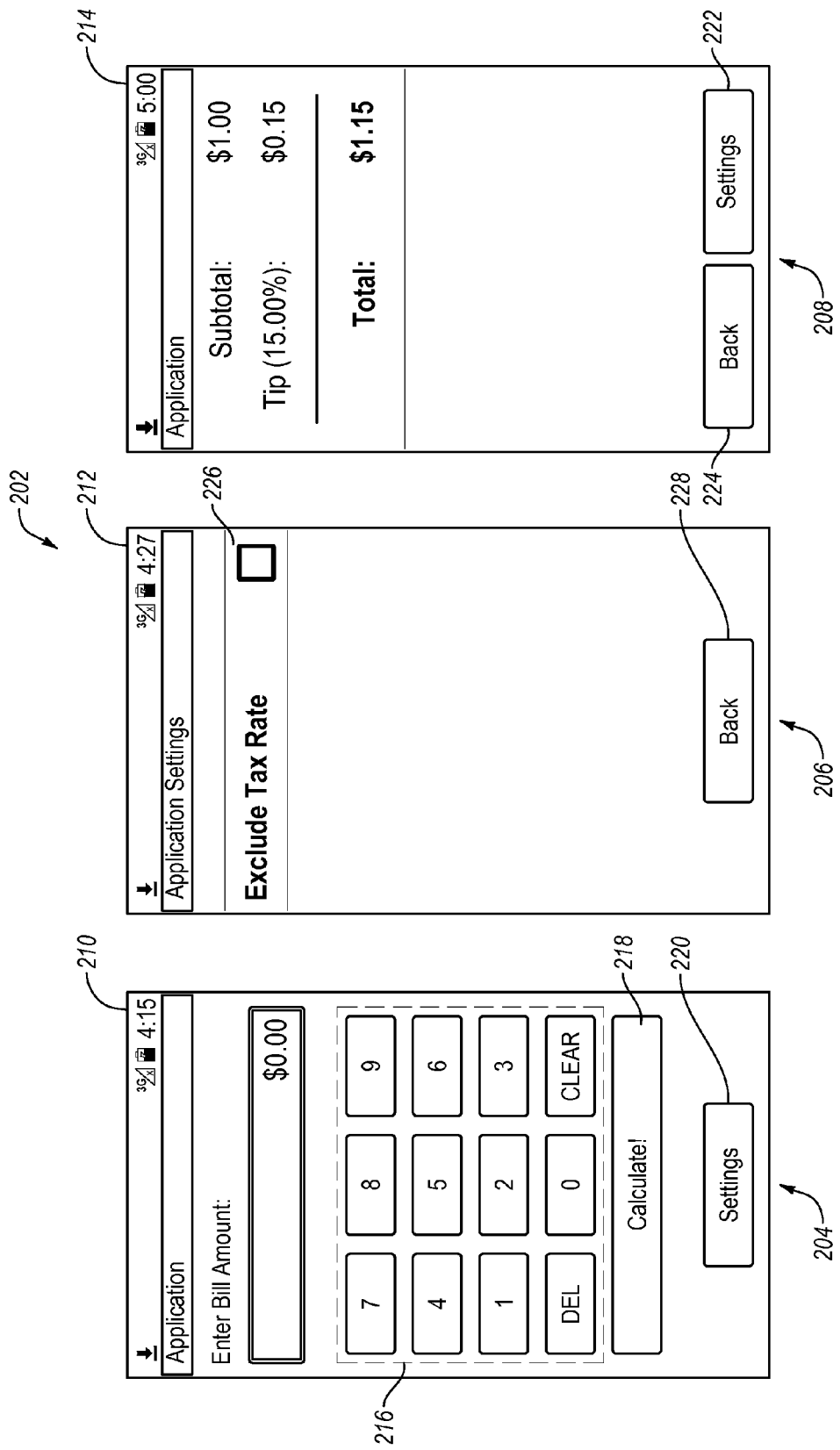
FIG. 2A illustrates example views and screens of a GUI application.

Modifications may be made to FIG. 2A without departing from the scope of the present disclosure. For example, in some embodiments, the "Back" and/or "Settings" buttons may be buttons that are part of the electronic device upon which the tipping application 202 may be installed and may not be expressly displayed on the associated screens. Additionally, the tipping application 202 may include any number of other functions, views, screens, and/or widgets. The specific examples are merely to aid in explanation and are not limiting of the present disclosure.

Returning to FIG. 1, in some instances, an operation executed with respect to a widget may result in an output of the GUI application 102 where the GUI application 102 may transition from one state of the GUI application 102 to another state of the GUI application 102. The transition may be between states associated with the same screen and view, states associated with different screens included with the same view, and/or states associated with different screens that may be included in different views.

Figure 2B:
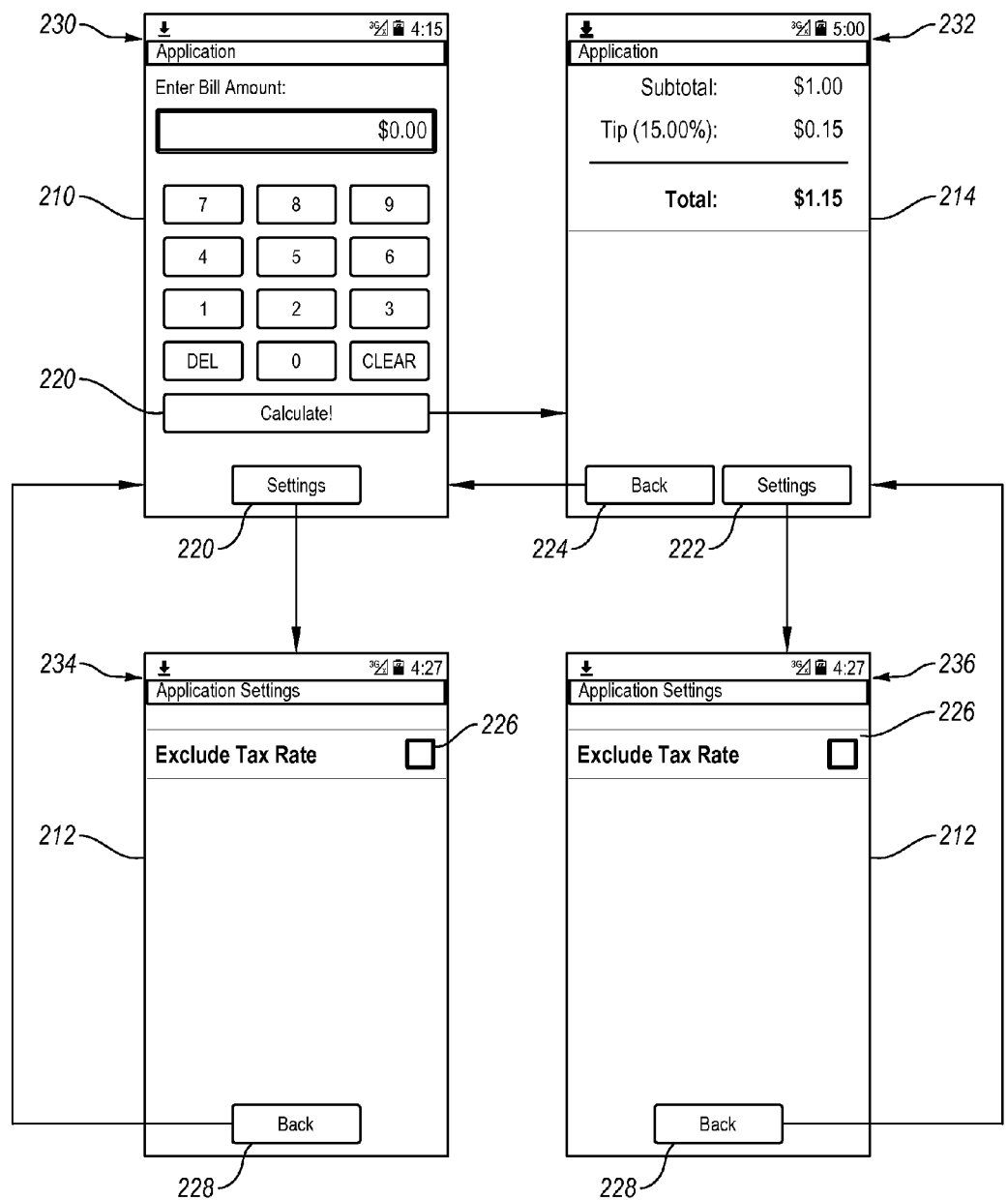
FIG. 2B illustrates example transitions between states associated with the GUI application of FIG. 2A.

FIG. 2B illustrates example transitions between states associated with the tipping application 202 of FIG. 2A, in accordance with at least one embodiment of the present disclosure. In the illustrated embodiment, a bill-input state 230 of the tipping application 202 may be associated with the bill-input screen 210. The tipping application 202 may be configured to transition from the bill-input state 230 to a tip-total state 232 associated with the tip-total screen 214 in response to a tap of the "Calculate" button associated with the calculate widget 218 of the bill-input screen 210. The tipping application 202 may also be configured to transition from the bill-input state 230 to a first settings state 234 associated with the settings screen 212 in response to a tap of the "Settings" button associated with the settings widget 220 of the bill-input screen 210.

With respect to the tip-total state 232 associated with the tip-total screen 214, the tipping application 202 may be configured to transition from the tip-total state 232 back to the bill-input state 230 in response to a tap of the "Back" button associated with the back widget 224 of the tip-total screen 214. Further, the tipping application 202 may be configured to transition from the tip-total state 232 to a second settings state 236 that may also be associated with the settings screen 212 in response to a tap of the "Settings" button associated with the settings widget 222 of the tip-total screen 214. Accordingly, both the first settings state 234 and the second settings state 236 of the tipping application 202 may be associated with the settings screen 212 because the settings screen 212 may be reached from both the bill-input screen 210 and associated bill-input state 230 and the tip-total screen 214 and associated tip-total state 232.

With respect to the second settings state 236, the tipping application 202 may be configured to transition from the second settings state 236 back to the tip-total state 232 in response to a tap of the "Back" button associated with the back widget 228 of the settings screen 212 because the second settings state 236 was reached from the tip-total screen 214 and associated tip-total state 232. With respect to the first settings state 234, the tipping application 202 may be configured to transition from the first settings state 234 back to the bill-input state 230 in response to a tap of the "Back" button associated with the back widget 228 of the settings screen 212 because the first settings state 234 was reached from the bill-input screen 210 and associated bill-input state 230.

Additionally, in both the first settings state 234 and the second settings state 236, toggling between checking and unchecking the box associated with the tax rate widget 226 may result in the tipping application 202 staying on the settings screen 212. In some embodiments, the tipping application 202 may be deemed to be in the same settings state regardless of whether the box associated with the tax rate widget 226 is checked or unchecked.

Returning to FIG. 1, the GUI application 102 may be configured to be received by an analysis module 104 that may be configured to generate a DFSM model 106 of the GUI application 102. In some embodiments, the analysis module 104 may include a processor 108 and memory 110. The processor 108 may be any suitable special purpose or general purpose computer including various computer hardware or software modules.

The memory 110 may include computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media. Computer-executable instructions may include, for example, instructions and data which cause the processor 108 to perform a certain function or group of functions.

In some embodiments, the analysis module 104 may be configured to generate the DFSM model 106 as a Mealy Machine model that represents the behavior of the GUI application 102. For example, in some embodiments, the analysis module 104 may be configured to generate as the DFSM model 106, a Mealy Machine model for the tipping application 202 of FIGS. 2A and 2B that may model the behavior of the tipping application 202 as described with respect to FIG. 2B.

In some embodiments, the analysis module 104 may be configured to generate the DFSM model 106 using dynamic crawling and a known active-learning algorithm that is referred to as the L* algorithm or different variants thereof. In general, the L*algorithm is an algorithm that examines input/output (I/O) sequences associated with a system under test (e.g., the GUI application 102) in a manner that a finite state model of the system under test and consistent with the observed I/O sequences may be generated by the L* algorithm. In some embodiments, a specific variant of the L* algorithm may be employed to learn a Mealy Machine model of the system, whose output values may be determined based on the current state and input values.

Typically the L* algorithm and associated DFSM models are useful for determining and modeling behavior of finite-state systems with finite input and output domains. However, GUI applications (e.g., the GUI application 102) typically are not naturally finite-state type of systems. Accordingly, the analysis module 104 may be configured to model the GUI application 102 in a manner that the GUI application 102 may be represented as a finite-state system to allow for use of the L* algorithm.

In some embodiments, the analysis module 104 may be configured to perform an abstraction to model input and output data as input and output types instead of the actual data. Such abstraction may allow for a finite number of states in instances where there may be infinite possibilities for the input and/or output data. Therefore, the abstraction may model the GUI application 102 in a manner that the GUI application 102 may be represented as a finite-state system, when it otherwise may not.

For example, from a technical standpoint and traditional way of viewing GUI applications, the tipping application 202 of FIGS. 2A and 2B—which may be used as the GUI application 102—may have an infinite number of potential input values in the bill-input screen 210 because any number may be used as the bill amount. Additionally, each bill amount may be considered as a different input and in some regards as corresponding to a different state of the tipping application 202. Similarly, the tip-total that may be displayed on the tip-total screen 214, which may be an output to the bill amount, may be any number depending on the bill amount entered on the bill-input screen 210. Thus, each screen, with a different value for the computed tip-total may be traditionally construed as a distinct output of the "Calculate" action on the bill-input screen 210.

However, as indicated above with respect to FIG. 2B, regardless of the bill amount entered in the bill-input screen 210, the tipping application may generate the tip-total screen 214 in response to tapping the "Calculate" button. Accordingly, the bill amount input on the bill-input screen 210 may be abstracted out as a single input type that is a number regardless of what the number is. Similarly, the tip-total amount that is output on the tip-total screen 214 may be abstracted out as a single output type that is a number regardless of what the number is.

Such abstraction may allow for the same state to be used for the bill-input screen 210 regardless of the bill amount—e.g., the bill-input state 230 may be used for the bill-input screen 210 regardless of the bill amount—such that a potentially infinite number of states associated with the bill-input screen 210 may be reduced to a finite number. Similarly, such abstraction may allow for the tip-total screen 214 to be used as the output of calculating the tip regardless of the bill-input amount and tip total amount—e.g., the tip-total state 232 may be used for the tip-total screen 214 regardless of the tip total—such that a potentially infinite number of states associated with the tip-total screen 214 may be reduced to a finite number.

Another type of abstraction that may be performed may be with respect to a collections field of the GUI application 102. A collections field may be a field of the GUI application 102 that may include any number of a series of items. For example, a collections field may be configured as a list of items, transactions, etc. Accordingly, from a technical standpoint and traditional way of viewing GUI applications, a screen of the GUI application 102 that includes a collections field potentially may be associated with an infinite number of states depending on how many items are included in the collections field. In contrast, in some embodiments of the present disclosure, a collections field of a particular screen of the GUI application 102 may be modeled using an abstraction that reduces the collections field to being associated with two different states, one where the collections field is empty and another when the collections field is not empty (also referred to as being populated). The empty state of the collections field may be abstracted as being associated with a first input on the particular screen and the populated state of the collections field may be abstracted as being associated with a second input on the particular screen. Using this abstraction, a potentially infinite number of states and inputs associated with the particular screen that includes the collections field may be reduced to a finite number.

The L* algorithm may also work based on the assumption that all operations and commands associated with the system under test—e.g., the GUI application 102—may be available in all states of the system under test. However, this may not be the case with GUI applications. To address this issue, the analysis module 104 may be configured to extend the true behavior of the GUI application to make it suitable for analysis through L* by generating a dummy state and dummy output for the GUI application 102 that may act as an error state and error output where actions that may be unavailable at a particular state may produce the error output and that may result in a transition to the error state. Accordingly, the GUI application 102 may be modeled such that all the actions associated with the GUI application 102 may be modeled as being available in every state of the GUI application 102 even when the actions may, in fact, be unavailable for particular screens and states.

For example, with respect to the tipping application 202, the following actions may be performed with respect to the tipping application 202: tapping on an icon associated with the tipping application 202 to launch the tipping application 202 (referred to hereinafter as "Init"), tapping the "Calculate" button (referred to hereinafter as "Cal"), tapping the "Settings" button (referred to hereinafter as "Set"), tapping the "Exclude Tax Rate" box (referred to hereinafter as "Tax"), and tapping the "Back" button (referred to hereinafter as "Back"). However, all of these actions may not be available on every screen or in every state. For example, the "Init," "Cal," and "Tax" actions may not be available on the tip-total screen 214 and in the tip-total state 232.

To allow for use of the L* algorithm and generation of the DFSM model with respect to the tipping application 202, a dummy error state and a dummy error output may be generated for the tipping application 202 such that transitions and their associated outputs in the tipping application 202 that may not be possible because of the unavailability of actions in a particular state may be captured by the dummy error state and the dummy error output. For example, performance of the unavailable actions "Init," "Cal," and "Tax" on the tip-total screen 214 and in the tip-total state 232 may be modeled as having responses that produce the dummy error output and result in a transition from the tip-total state 232 to the dummy error state. Accordingly, the unavailable actions "Init," "Cal," and "Tax" may be modeled as being available on the tip-total screen 214 and in the tip-total state 232 even though they may not actually be available on the tip-total screen 214 and in the tip-total state 232.

The L* algorithm may also be traditionally configured such that the L* algorithm begins at an initial state associated with the system under test—e.g., the GUI application 102—where the initial state may be the same state each time. However, in some instances, the GUI application 102 may include more than one initial state. Accordingly, to allow for use of the L* algorithm with respect to the GUI application 102, the analysis module 104 may generate a dummy initial state for the GUI application 102. The analysis module 104 may be configured to model the GUI application 102 as beginning at an actual initial state by modeling a transition from the dummy initial state to the actual initial state as an response to a dummy input action in the dummy initial state.

For example, the analysis module 104 may generate a dummy initial state for the GUI application 102 when the GUI application 102 may include a first initial state and a second initial state. The analysis module 104 may model the GUI application 102 beginning at the first initial state by generating a transition from the dummy initial state to the first initial state based on a first dummy action performed at the dummy initial state. The analysis module 104 may similarly model the GUI application 102 beginning at the second initial state by generating a transition from the dummy initial state to the second initial state based on a second dummy action performed at the dummy initial state.

Further, in some embodiments the analysis module 104 may be configured to treat stacks associated with the GUI application 102 as being bounded and having a finite number of configurations that may each be associated with a different state and input/output sequence of the GUI application 102. For example, the tipping application 202 of FIGS. 2A and 2B may have three different screens and at most two layers of actions to reach any one of the screens of the tipping application 202. Therefore, a back stack of the tipping application 202 associated with "Back" actions may have two fields and four different possibilities for each field—empty, the bill-input screen 210, the settings screen 212, and the tip-total screen 214. As such, the back stack may have sixteen different configurations as far as populating the back stack, which may each be associated with different outputs of the tipping application 202 and may also be a finite amount. In contrast, traditional methods of modeling stacks use pushdown automatons, which assume the use of an unbounded stack to model the stack-based behavior of the real application.

Based on the modeling of the GUI application 102 described above such that the GUI application 102 may be modeled as the DFSM model 106, the analysis module 104 may be configured to generate the DFSM model 106 by dynamically crawling the GUI application 102 and performing the L* algorithm. In some embodiments, the analysis module 104 may be configured to generate the DFSM model 106 in accordance with methods 300, 400, and 500 described below with respect to FIGS. 3-5. As mentioned above, the DFSM model 106 may be used to test the GUI application 102 to find bugs or other problems that may be associated with the GUI application 102 performing as expected and desired.

Figure 2C:
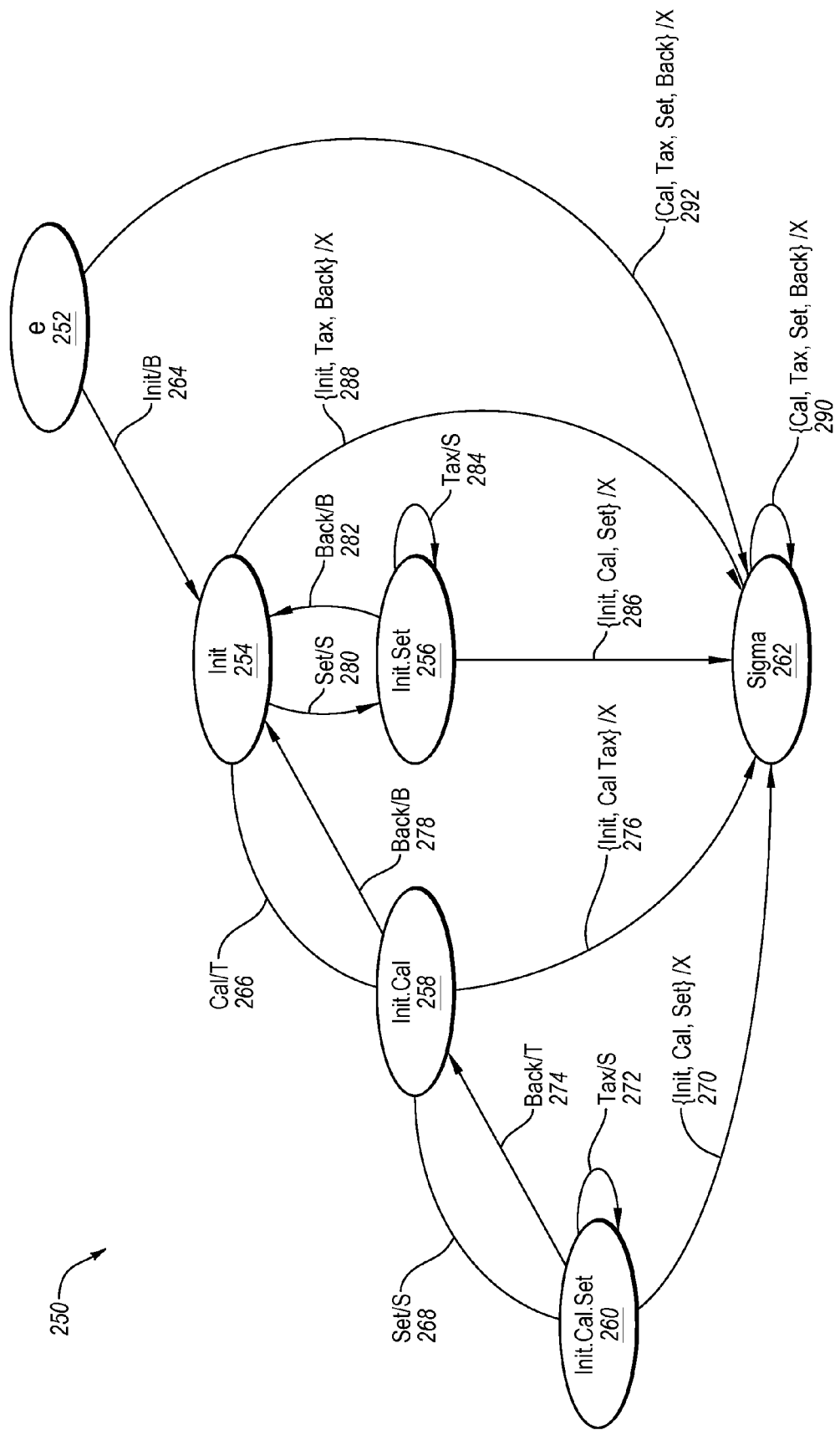
FIG. 2C is an example DFSM that may be generated for the GUI application of FIG. 2A.

FIG. 2C is an example DFSM model 250 (referred to hereinafter as the "model 250") that may be generated for the tipping application 202, in accordance with at least one embodiment of the present disclosure. The model 250 may include a dummy initial state 252, labeled as "e," that may act as the dummy initial state described above. The dummy initial state may be represented as being an output to a NULL or dummy action (designated as "e" and forming the label of the dummy initial state 252) because no actual action in the tipping application 202 may result in arriving at the dummy initial state.

The model 250 may include an initial state 254 that may correspond with the bill-input state 230 and the bill-input screen 210. As described above with respect to FIG. 2B, launching the tipping application 202 may result in the bill-input screen 210 being displayed as an output. Accordingly, the model 250 may include a transition edge 264 that may indicate a transition from the dummy initial state 252 to the initial state 254. In the illustrated embodiment, the transition from the dummy initial state 252 to the initial state 254 is denoted by the I/O sequence of "Init/B" indicating that performing a launch action (denoted as "Init") with respect to the tipping application 202 may cause the tipping application 202 to display or output the bill-input screen 210 (denoted as "B").

The model 250 may include a dummy error state 262 and a transition edge 292 that may indicate a transition from the dummy initial state 252 to the dummy error state 262. In the illustrated embodiment, the transition from the dummy initial state 252 to the dummy error state 262 indicated by the transition edge 292 may be denoted by the I/O sequence "{Cal, Tax, Set, Back}/X" because "Cal," "Tax," "Set," and "Back" may be unavailable actions to launch the tipping application 202. Accordingly, performance of the unavailable actions "Cal," "Tax," "Set," and "Back" at the dummy initial state 252 may result in a transition to the dummy error state 262 (also indicated by the label "Sigma") and production of the dummy output "X".

The model 250 may further include subsequent states 256, 258, and 260 that may be reached via one or more actions performed with respect to the initial state 254. In the illustrated embodiment, the subsequent state 256 may be associated with the settings screen 212 and first settings state 234 of FIG. 2B. As indicated in FIG. 2B, the tipping application may transition to the first settings state 234 on tapping the "Settings" button associated with the settings widget 220 of the bill-input screen 210. Accordingly, the model 250 may include a transition edge 280 that may indicate a transition from the initial state 254 to the subsequent state 256 with a denoted I/O sequence "Set/S," where "S" indicates the generating of the settings screen 212 as the output to tapping the "Settings" button. The subsequent state 256 may also be labeled by the input sequence "Init.Set."

A self-transition edge 284 at the subsequent state 256 associated with an I/O sequence of "Tax/S" indicates staying in the subsequent state 256 in response to the "Tax" action to denote that clicking on the box associated with the tax rate widget 226 of the settings screen 212 of FIG. 2B may result in the tipping application 202 staying on the settings screen 212 and in the first settings state 234. Additionally, a transition edge 286 may indicate a transition from the subsequent state 256 to the dummy error state 262 based on the denoted I/O sequence of "{Init, Cal, Set}/X" because "Init," "Cal," and "Set" may be unavailable actions in the settings screen 212 of the tipping application 202, which may be associated with the subsequent state 256.

Further, as indicated above with respect to FIG. 2B, clicking on the "Back" button in the settings screen 212 of the first settings state 234 may cause the tipping application 202 to transition back to the bill-input screen 210 and the associated bill-input state 230 as a response to clicking on the "Back" button based on information included in the back stack of the tipping application 202. Accordingly, the model 250 may include a transition edge 282 that may indicate a transition from the subsequent state 256 back to the initial state 254 and bill-input screen 210, as denoted by the I/O sequence "Back/B."

The model 250 may include a transition edge 288 that may indicate a transition from the initial state 254 to the dummy error state 262. In the illustrated embodiment, the transition from the initial state 254 to the dummy error state 262 indicated by the transition edge 288 may be denoted by the I/O sequence "{Init, Tax, Back}/X" because "Init," "Tax," and "Back" may be unavailable actions in the bill-input screen 210 of the tipping application 202, which may be associated with the initial state 254.

As indicated in FIG. 2B, the tipping application may transition to the tip-total screen 214 and tip-total state 232 based on tapping the "Calculate" button associated with the calculate widget 218 of the bill-input screen 210. Accordingly, the model 250 may include a transition edge 266 that may indicate a transition from the initial state 254 to the subsequent state 258 with an denoted I/O sequence of "Cal/T," where "T" indicates the tip-total screen 214 as the output. The subsequent state 258 may also be labeled by the input sequence "Init.Cal."

A transition edge 276 may indicate a transition from the subsequent state 258 to the dummy error state 262 based on the denoted I/O sequence of "{Init, Cal, Tax}/X" because, as illustrated in FIG. 2B, "Init," "Cal," and "Tax" may be unavailable actions on the tip-total screen 214 and in the associated tip-total state 232, which may be associated with the subsequent state 258 of FIG. 2C.

Further, as indicated above with respect to FIG. 2B, clicking on the "Back" button in the tip-total screen 214 of the associated tip-total state 232 may cause the tipping application 202 to transition from the tip-total screen 214 and tip-total state 232 back to the bill-input screen 210 and the associated bill-input state 230 based on information included in the back stack of the tipping application 202. Accordingly, the model 250 may include a transition edge 278 that may indicate a transition from the subsequent state 258 back to the initial state 254, as denoted by the I/O sequence "Back/B."

Moreover, the model 250 may include a transition edge 268 that may be associated with a transition from the subsequent state 258 to the subsequent state 260. The transition edge 268 may indicate the transition from the tip-total screen 214 and associated tip-total state 232 to the settings screen 212 and associated second settings state 236 described with respect to FIG. 2B. Accordingly, the transition edge 268 may be denoted by the I/O sequence of "Set/S." The subsequent state 260 may also include the input sequence "Init.Cal.Set" as a label.

A self-transition edge 272 at the subsequent state 260 associated with an I/O sequence of "Tax/S" indicates staying in the subsequent state 260 in response to the "Tax" action to denote that clicking on the box associated with the tax rate widget 226 of the settings screen 212 of FIG. 2B may result in the tipping application 202 staying on the settings screen 212 and in the second settings state 236. Additionally, a transition edge 270 may indicate a transition from the subsequent state 260 to the dummy error state 262 based on the denoted I/O sequence of "{Init, Cal, Set}/X" because "Init," "Cal," and "Set" may be unavailable actions on the settings screen 212 and in the second settings state 236, which may be associated with the subsequent state 260.

Further, as indicated above with respect to FIG. 2B, clicking on the "Back" button in the settings screen 212 of the associated second settings state 236, may cause the tipping application 202 to transition back to the tip-total screen 214 and the associated tip-total state 232. Accordingly, the model 250 may include a transition edge 274 that may indicate a transition from the subsequent state 260 back to the subsequent state 258, as denoted by the I/O sequence "Back/T."

As such, FIG. 2C illustrates an example DFSM model of the tipping application 202 described with respect to FIGS. 2A and 2B that may be generated according to the present disclosure. In some embodiments, the generation of the DFSM model for the tipping application 202 and other GUI applications such as the GUI application 102 may be based on the methods 300, 400, and 500 described below with respect to FIGS. 3-5.

Figure 3:
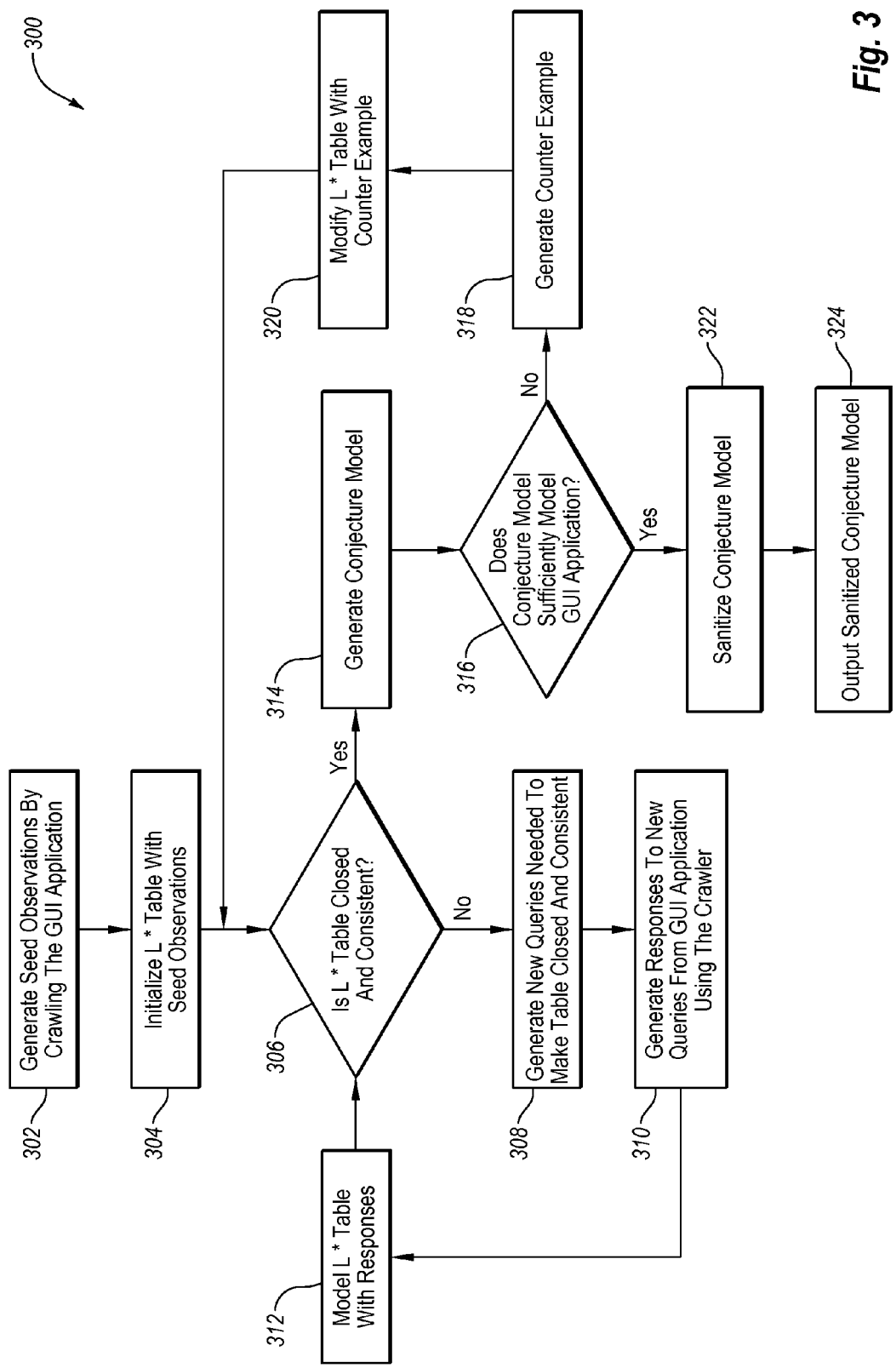
FIG. 3 is a flowchart of an example method of generating a DFSM model of a GUI application.

FIG. 3 is a flowchart of an example method 300 of generating a DFSM model of a GUI application, in accordance with at least one embodiment of the present disclosure. The method 300 may be implemented in some embodiments by an analysis module, such as the analysis module 104 of FIG. 1. For instance, the processor 108 of the analysis module 104 may be configured to execute computer instructions stored in the memory 110 to perform operations for generating a DFSM model of the GUI application 102, as represented by one or more of blocks of the method 300. Although illustrated as discrete blocks, various blocks may be divided into additional blocks, combined into fewer blocks, or eliminated, depending on the desired implementation.

The method 300 may begin, and at block 302, seed observations of the GUI application under test may be generated by dynamically crawling the GUI application. One example of how the dynamic crawl may be executed is described in further detail below with respect to FIG. 4. The dynamic crawl may be performed to observe I/O sequences of the GUI application that may be used by an L* algorithm such that the L* algorithm has a suitable launch point from which to learn other behavior of the GUI application.

Additionally, based on the actions that may be observed during the crawling of the GUI application 102 and the screens of the GUI application 102 that may be observed during the crawling, I/O sequences for actions that may be unavailable for one or more screens of the GUI application 102 may be inferred, where the output of an unavailable action may be the dummy error output. The observed and inferred I/O sequences may be the seed observations of the GUI application.

For example, using nomenclature described above with respect to the tipping application 202 where "Init" denotes the action of launching the tipping application 202, "Cal" denotes tapping the "Calculate" button, "Set" denotes tapping the "Settings" button, "Back" denotes tapping the "Back" button, "Sigma" denotes the complete set of actions {Init, Cal, Set, Back}, "B" denotes the bill-input screen 210, "T" denotes the tip-total screen 214, "S" denotes the settings screen 212, and "X" denotes the dummy error output, crawling of the tipping application 202 may result in observations listed by Table 1.

TABLE 1

| I/O Sequences Observed by Crawling |
|---|
| Init/B, Cal/T, Set/S, Back/T |
| Init/B, Cal/T, Set/S, Tax/S |
| Init/B, Cal/T, Back/B |
| Init/B, Set/S |
| Inferred I/O Sequences for Unavailable Actions |
| [Cal, Set, Tax, Back]/X, Sigma/X |
| Init/B, [Init, Tax, Back]/X, Sigma/X |
| Init/B, Cal/T, [Init, Cal, Tax]/X, Sigma/X |
| Init/B, Cal/T, Set/S, [Init, Cal, Set]/X, Sigma/X |

Returning to the method 300, at block 304, the observed and inferred I/O sequences may be used to initialize and populate an L* algorithm observation table (referred to hereinafter as the "L* table") that may be used as a starting point for the L* algorithm, which may increase the efficiency of the L* algorithm as well as allow for the L* algorithm to be used to learn the behavior of the GUI application. In contrast, in many instances, failure to provide the L* algorithm with an initial observation table may result in the L* algorithm taking too much time to learn the behavior of the GUI application.

For example, based on the I/O sequences of Table 1, an initial L* table may be generated for the tipping application 202 as illustrated in Table 2 where the row labels (recorded in the column on the far left) indicate various action sequences already performed, column labels (indicated by the cells in the top row) indicate another set of action or action sequences based on the set of available input actions in the application, and the other cells record an appropriate suffix of the resulting output of the application under test to the action sequence formed by concatenating the sequences in the row label and column label of that cell.

TABLE 2

|  | Init | Cal | Set | Tax | Back |
|---|---|---|---|---|---|
| S |  |  |  |  |  |
| e | B | X | X | X | X |
| S.I |  |  |  |  |  |
| Init | X | T | S | X | X |
| {Cal, Set, Tax, Back} | X | X | X | X | X |

At block 306, it may be determined whether the L* table initialized at block 304 is closed and consistent. In some embodiments, the L* algorithm may be performed with respect to the L* table to determine whether the L* table is closed and consistent, which may be indicated by the process performed by the L* algorithm converging. When the L* table is not closed and consistent, the method 300 may proceed to block 308, where the L* algorithm may generate one or more queries about the behavior of the GUI application where the answers to such queries may possibly make the L* table closed and consistent.

For example, based on Table 2 above, the L* algorithm may determine that Table 2 is not closed and consistent because of the responses recorded in its last two rows, and based on Tables 1 and 2, the L* algorithm may generate Table 3, where the last row indicates queries about the tipping application 202 that may be generated by the L* algorithm.

TABLE 3

|  | Init | Cal | Set | Tax | Back |
|---|---|---|---|---|---|
| S |  |  |  |  |  |
| e | B | X | X | X | X |
| Init | X | T | S | X | X |
| Cal, Set, Tax, Back | X | X | X | X | X |
| S.I |  |  |  |  |  |
| Init | X | T | S | X | X |
| Cal, Set, Tax, Back | X | X | X | X | X |
| [Cal, Set, Tax, Back]. Sigma | X | X | X | X | X |
| Init. [Init, Tax, Back] | X | X | X | X | X |
| Init. Cal | X | X | S | X | B |
| Init. Set | ? | ? | ? | ? | ? |

At block 310, the queries may be input into the dynamic crawler to obtain the answers to the queries through another crawl of the GUI application that is directed based on the queries (referred to as a "directed crawl"). The treatment of the queries by the dynamic crawler is also described with respect to method 400. In addition to answering the specific queries, the directed crawl may also be configured to determine additional I/O sequences of the GUI application that may not be specifically part of the queries.

At block 312, the L* table may be modified and updated according to the I/O sequences observed during the directed crawl. Accordingly, L* table may be updated according to the answers to the queries that may be generated during the crawl as well as according to the other I/O sequences that may be observed during the directed crawl. The method 300 may return to block 306 after block 312 where the L* algorithm may be executed again with respect to the modified L* table to determine whether the modified L* table is now closed and consistent. Blocks 306, 308, 310, and 312 may be repeated any number of times until the L* table is deemed to be closed and consistent.

For example, based on the queries generated with respect to Table 3, the dynamic crawler may be executed and I/O sequences illustrated in Table 4 may be generated.

TABLE 4

I/O Sequences Observed by Crawling

Init/B, Cal/T, Set/S, Back/T
Init/B, Cal/T, Set/S, Tax/S
Init/B, Cal/T, Back/B

TABLE 4-continued

Init/B, Set/S, Tax/S
Init/B, Set/S, Back/B
Inferred I/O Sequences for Unavailable Actions

[Cal, Set, Tax, Back]/X, Sigma/X
Init/B, [Init, Tax, Back]/X, Sigma/X
Init/B, Cal/T, [Init, Cal, Tax]/X, Sigma/X
Init/B, Cal/T, Set/S, [Init, Cal, Set]/X, Sigma/X
Init/B, Set/S, [Init, Cal, Set]/X, Sigma/X The I/O sequences of Table 4 may be used to update the L* table associated with Table 3 to generate Table 5 below.

TABLE 5

|  | Init | Cal | Set | Tax | Back |
|---|---|---|---|---|---|
| S |  |  |  |  |  |
| e | B | X | X | X | X |
| Init | X | T | S | X | X |
| Cal, Set, Tax, Back | X | X | X | X | X |
| S.I |  |  |  |  |  |
| Init | X | T | S | X | X |
| Cal, Set, Tax, Back | X | X | X | X | X |
| [Cal, Set, Tax, Back]. Sigma | X | X | X | X | X |
| Init. [Init, Tax, Back] | X | X | X | X | X |
| Init. Cal | X | X | S | X | B |
| Init. Set | X | X | X | S | B |

The L* algorithm may then determine that the last two rows of Table 5 are responsible for it not being closed and consistent and may generate a revised table with another set of queries, which may be run by the dynamic crawler to update the L* table and enable determining whether the updated L* table is closed and consistent according to blocks 306, 308, 310, and 312. This process may be repeated with a series of L* tables and queries until the L* algorithm deems the L* table associated with the tipping application 202 to be closed and consistent.

Returning to the method 300, when the L* table is deemed to be closed and consistent, the method 300 may proceed from block 306 to block 314 where a conjecture model may be generated by the L* algorithm based on the L* table. The conjecture model may be a DFSM model that is a conjecture of how the GUI application operates. For example, when the L* table associated with the tipping application 202 is deemed to be closed and consistent, the model 250 of FIG. 2C may be generated as the conjecture model based on the L* table for the tipping application 202.

At block 316, it may be determined whether the conjecture model sufficiently models the GUI application. An example of determining whether the conjecture model sufficiently models the GUI application is described with respect to a method 500 of FIG. 5 below. When the conjecture model does not sufficiently model the GUI application, the method 300 may proceed to block 318. At block 318, a counter example may be generated that may indicate a series of operations with respect to the conjecture model and the GUI application where the same result is not obtained. An example of generation of the counter example is also described with respect to FIG. 5. At block 320, the L* table may be modified based on the counter example generated at block 318 and the method 300 may return to block 306.

When it is determined that the conjecture model does sufficiently model the GUI application at block 316, the method 300 may proceed to block 322. At block 322, the conjecture model may be sanitized in which extraneous material included in the conjecture model may be removed. For example, the conjecture model may include a dummy error state that may be associated with unavailable actions at one or more states of the GUI application and at block 322, the dummy error state and the associated transition edges that lead to the dummy error state of the conjecture model may be removed from the conjecture model. At block 324, the sanitized conjecture model may be output as the GUI model of the GUI application.

Figure 4:
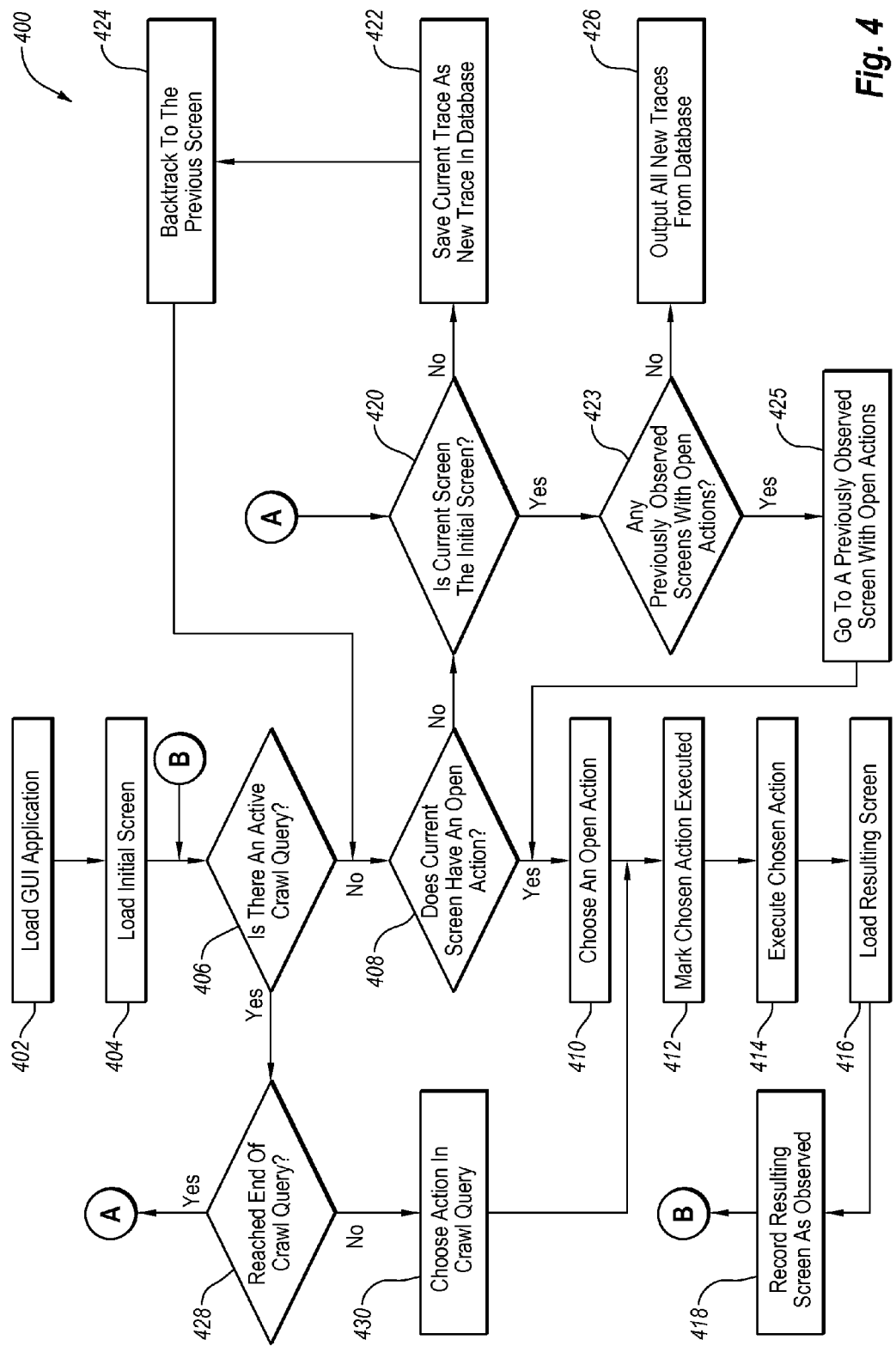
FIG. 4 is a flowchart of an example method of crawling a GUI application.

FIG. 4 is a flowchart of an example method 400 of crawling a GUI application, arranged in accordance with at least one embodiment of the present disclosure. As mentioned above, the method 400 may be used to perform operations with respect to blocks 302 and 310 of the method 300 described above. The method 400 may be implemented in some embodiments by an analysis module, such as the analysis module 104 of FIG. 1. For instance, the processor 108 of the analysis module 104 may be configured to execute computer instructions stored in the memory 110 to perform operations for crawling the GUI application 102, as represented by one or more of blocks of the method 400. Although illustrated as discrete blocks, various blocks may be divided into additional blocks, combined into fewer blocks, or eliminated, depending on the desired implementation.

The method 400 may begin, and at block 402, the GUI application may be loaded. At block 404, an initial screen of the GUI application may be loaded. At block 406, it may be determined whether an active crawl query has been received. For example, at block 406 it may be determined whether an active crawl query has been received based on the operations performed at block 308 of the method 300.

If there is not an active crawl query, the method 400 may proceed to block 408 where it may be determined whether the current screen of the GUI application—which may be the initial screen—has any actions that have not been executed or crawled. Actions that have not been executed or crawled may be referred to hereinafter as "open actions." When the current screen does have an open action at block 408, the open action may be chosen at block 410. At block 412, the chosen action may be marked as executed such that the chosen action may not be considered open anymore.

At block 414, the chosen action may be executed and, at block 416, the screen resulting from the execution of the action (referred to as the "resulting screen") may be loaded. At block 418, the resulting screen may be recorded as having been observed and may be set as the current screen. Following block 418, the method 400 may return to block 406.

At block 406, it may be determined again if there is an active crawl query and if not, the method 400 may proceed again to block 408. At block 408, if the current screen does not have any open actions, the method 400 may proceed to block 420 where it may be determined whether the current screen is an initial screen. If the current screen is not an initial screen at block 420, the method 400 may proceed to block 422. At block 422, the current path and trace through the GUI application that may be used to reach the current screen may be saved as a new trace of the GUI application. At block 424, the GUI application may be backtracked to the previous screen and the method 400 may return to block 408.

Returning to block 420, if the current screen is an initial screen at block 420, the method 400 may proceed to block 423 where it may be determined whether any previously observed or crawled screens have any open actions. If it is determined at block 423 that a previously observed screen has any open actions, a previously observed screen with one or more open actions may be loaded at block 425, and the method 400 may return to block 410. In contrast, if it is determined at block 423 that there are no previously observed screens with open actions, the method 400 may proceed to a block 426 where the paths and traces of the GUI application that have been determined during the current dynamic crawl may be output. As described above, the output traces and paths may be used to populate one or more fields of an L* table such that a GUI model may be generated for the GUI application that may be crawled using the method 400.

Returning to block 406, if there is an active crawl query at block 406, the method 400 may proceed to block 428 where it may be determined whether an end of the crawl query has been reached. If the end of the crawl query has not been reached, the method 400 may proceed to block 430 where a next action in the crawl query may be chosen. Following block 430, the method 400 may proceed to block 412 such that the steps associated with blocks 412, 414, 416, and 418 may be performed with respect to the queried action and the method 400 may return to block 406. The method 400 may repeat blocks 406, 428, 430, 412, 414, 416, and 418 until the end of the crawl query has been reached and determined as such at block 428. Once the end of the crawl query has been reached and determined as such at block 428, the method 400 may proceed to block 420.

As mentioned with respect to the method 300, the crawl query may be generated in response to the L* table being incomplete—e.g., not closed and consistent. Accordingly, blocks 406, 428, 430, 412, 414, 416, and 418 of the method 400 may be used to determine and obtain behavior information about the GUI application that may help complete the L* table such that it may become closed and consistent. Additionally, as described above, the closed and consistent L* table may be used to generate the conjecture model, which may be compared with the GUI application according to the method 500 of FIG. 5.

Figure 5:
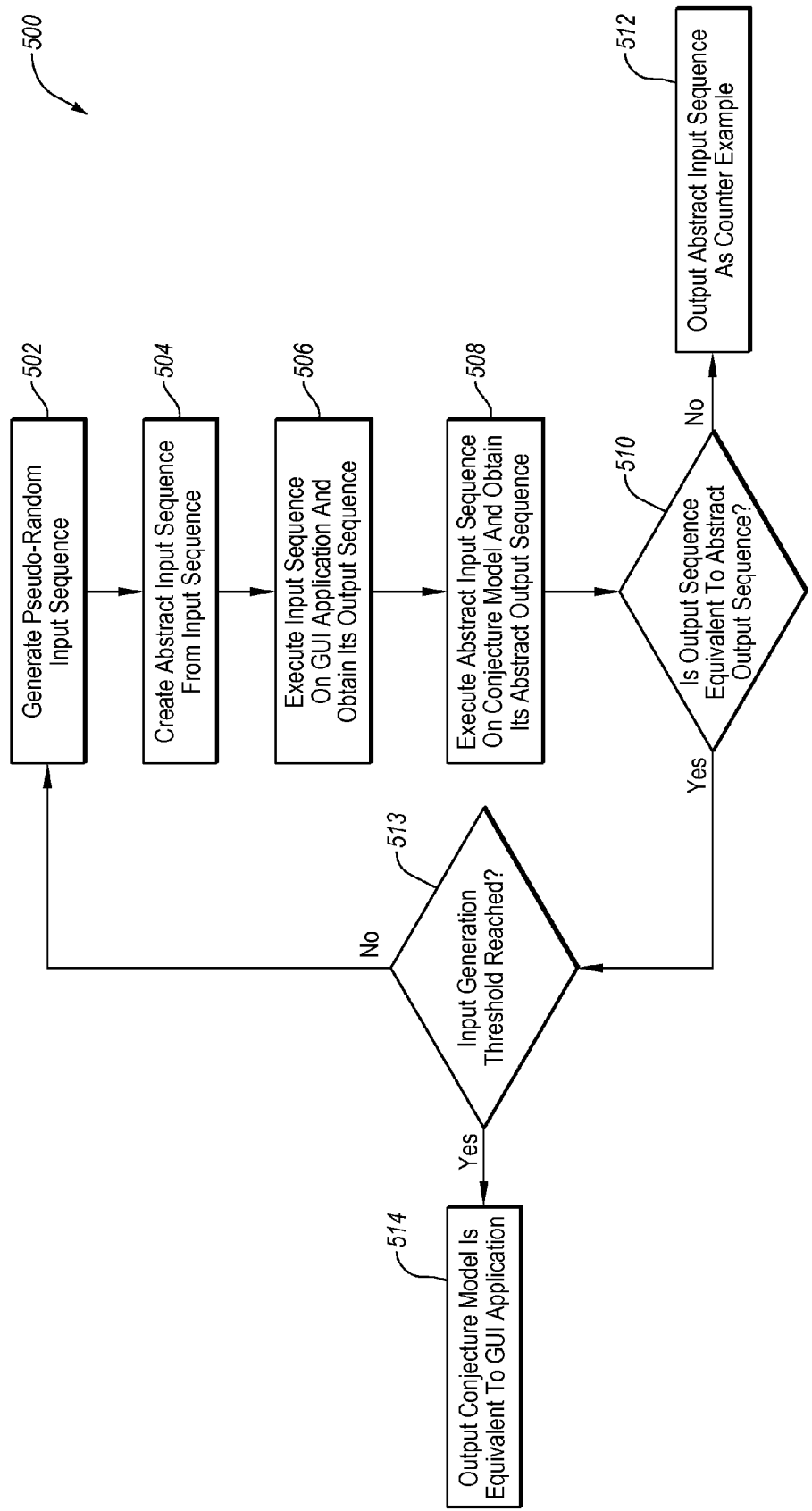
FIG. 5 is a flowchart of an example method of determining whether a conjecture model sufficiently models an associated GUI application.

FIG. 5 is a flowchart of an example method 500 of determining whether a conjecture model sufficiently models an associated GUI application, arranged in accordance with at least one embodiment of the present disclosure. As mentioned above, the method 500 may be used to perform operations with respect to blocks 316 and 318 of the method 300 described above. The method 500 may be implemented in some embodiments by an analysis module, such as the analysis module 104 of FIG. 1. For instance, the processor 108 of the analysis module 104 may be configured to execute computer instructions stored in the memory 110 to perform operations, as represented by one or more of blocks of the method 500. Although illustrated as discrete blocks, various blocks may be divided into additional blocks, combined into fewer blocks, or eliminated, depending on the desired implementation.

The method 500 may begin at block 502, where a pseudo-random input sequence (referred to hereinafter as the "input sequence") associated with the GUI application may be generated. The input sequence may include any suitable set of actions that may be performed by the GUI application to determine the behavior of the GUI application in response to the input sequence.

At block 504 an abstract input sequence may be generated from the input sequence. The abstract input sequence may include a set of actions that may correlate to the actions of the input sequence and that may be used as actions in the conjecture model to determine sequences of operations of the GUI application as modeled by the conjecture model.

At block 506, the input sequence may be executed with respect to the GUI application to obtain an associated output sequence. At block 508, the abstract input sequence may be executed with respect to the conjecture model to obtain an associated abstract output sequence. At block 510, it may be determined whether the output sequence is substantially equivalent to the abstract output sequence.

If the output sequence is not substantially equivalent to the abstract output sequence, the method 500 may proceed to block 512 where the abstract input sequence may be output as a counter example that may be used as the counter example generated at block 318 of the method 300 described above. If the output sequence is substantially equivalent to the abstract output sequence at block 510, the method 500 may proceed to block 513.

At block 512, it may be determined whether an input generation threshold has been reached. The input generation threshold may be associated with a pre-determined number of input sequences or a pre-determined time for generation of such sequences or some combination of these criteria, that are deemed to adequately test the different paths of the GUI application and the conjecture model in order to asses that the GUI application may be sufficiently modeled by the conjecture model. If the input generation threshold has not been reached, the method 500 may return to block 502. In contrast, if the input generation threshold has been reached, the method 500 may proceed to block 514, where the conjecture model may be deemed to sufficiently model the GUI application, which in some embodiments may cause the method 300 described above to proceed from block 316 to block 322.

Therefore, the methods 300, 400, and 500 may be used to extract and generate a DFSM model of the GUI application. The GUI model may accordingly be used to verify and test the behavior of the GUI application, and in some instances, may be used to troubleshoot and/or detect bugs associated with the GUI application.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
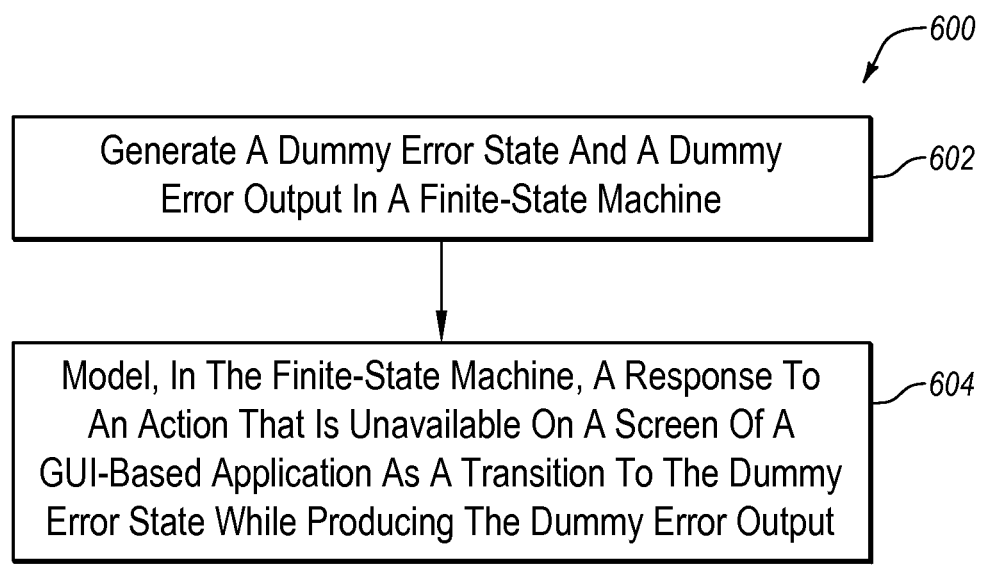
FIG. 6 is a flowchart of an example method of modeling a GUI application.

FIG. 6 is a flowchart of an example method 600 of modeling a GUI application, arranged in accordance with some embodiments of the present disclosure. The method 600 may be implemented in some embodiments by an analysis module, such as the analysis module 104 of FIG. 1. For instance, the processor 108 of the analysis module 104 may be configured to execute computer instructions stored in the memory 110 to perform operations for modeling the GUI application 102, as represented by one or more of blocks of the method 600. Although illustrated as discrete blocks, various blocks may be divided into additional blocks, combined into fewer blocks, or eliminated, depending on the desired implementation.

The method 600 may begin at block 602 where a dummy error state and a dummy error output may be generated in a finite-state machine. At block 604, a response to an action that is unavailable on a screen of a GUI application may be modeled as a transition to the dummy error state while producing the dummy error output in the finite-state machine.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the screen may be modeled as an output in the finite-state machine. In these or other embodiments, the method 600 may include modeling an action on the screen as an input in the finite-state machine and modeling a subsequent screen, generated by the GUI based application in response to the action performed on the screen, as another output in the finite-state machine. Therefore, the finite-state machine may be finite even in instances when an infinite number of inputs may be present.

Similarly, in some embodiments, the screen may include a collections field and the method 600 may include steps associated with modeling the screen in the finite-state machine such that the collections field is associated with a first output in the finite-state machine when the collections field is empty and the collections field is associated with a second output in the finite-state machine when the collections field is populated. Once again, modeling the GUI application in this manner may allow for the finite-state machine to be finite even in instances when an infinite number of items may be possible as being present in the collections field.

Additionally, in some embodiments, the method 600 may include modeling a stack of the GUI application as a bounded stack that includes a finite number of configurations and modeling each of the configurations as part of the states in the finite-state machine using input/output sequences in the finite-state machine to distinguish between different configurations. Modeling the stack in this manner may allow for modeling stacks in the form of a finite-state machine when traditionally stacks are modeled using formalisms with infinite size stacks rather than incorporating them into the state.

Moreover, in these or other embodiments, the GUI application may include multiple initial screens and/or states (e.g., a first initial screen and a second initial screen with associated first and second initial states, respectively). In these or other embodiments, the method 600 may include steps associated with modeling, in the finite-state machine, a transition from a dummy initial state to a first initial state of the finite-state machine as a first response to a first dummy action performed with respect to the dummy initial state. The first initial state may be associated with the first initial screen. The method 600 may also include modeling, in the finite-state machine, a transition from the dummy initial state to a second initial state of the finite-state machine as a second response to a second dummy action performed with respect to the dummy initial state. The second initial state may be associated with the second initial screen.

As indicated above, the embodiments described herein may include the use of a special purpose or general purpose computer (e.g., the processor 108 of FIG. 1) including various computer hardware or software modules, as discussed in greater detail below.

Further, as indicated above, embodiments described herein may be implemented using computer-readable media (e.g., the memory 110 of FIG. 1) for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of modeling a graphical user interface (GUI) based application as a finite-state machine, the method comprising:
    generating a screen-based state in a finite-state machine, the screen-based state corresponding to a screen of a graphical user interface (GUI) based application;
    generating a dummy error state and a dummy error output in the finite-state machine; and
    modeling a response to an action that is unavailable on the screen of the GUI-based application as a transition from the screen-based state to the dummy error state in the finite-state machine while producing the dummy error output in the finite-state machine.

2. The method of claim 1 further comprising:
    modeling an action on the screen as an input in the finite-state machine; and
    modeling a subsequent screen, generated by the GUI-based application in response to the action performed on the screen, as an output in the finite-state machine.

3. The method of claim 1, wherein the screen includes a collections field, the method further comprising modeling the screen in the finite-state machine such that the collections field is associated with a first output in the finite-state machine when the collections field is empty and the collections field is associated with a second output in the finite-state machine when the collections field is populated.

4. The method of claim 1, further comprising modeling a stack of the GUI-based application as a bounded stack that includes a finite number of configurations and modeling each of the configurations as part of the states in the finite-state machine using input/output sequences in the finite-state machine to distinguish between different configurations.

5. The method of claim 1, wherein the GUI-based application includes a first initial state and a second initial state and wherein the method further comprises:
    modeling, in the finite-state machine, a transition from a dummy initial state to a first initial state of the finite-state machine as a first response to a first dummy action performed with respect to the dummy initial state; and
    modeling, in the finite-state machine, a transition from the dummy initial state to a second initial state of the finite-state machine as a second response to a second dummy action performed with respect to the dummy initial state.

6. A method of generating a deterministic finite-state model of a graphical user interface (GUI) based application, the method comprising:
    performing a crawl of a graphical user interface (GUI) based application to determine input/output sequences of the GUI-based application;
    modeling a response to an input action that is unavailable on a screen of the GUI-based application as a dummy error output;
    generating an observation table of an active learning algorithm ("L* algorithm") based on the input/output sequences of the GUI-based application determined during the crawl and based on the unavailable input action and dummy error output in which the observation table includes the unavailable input action and the dummy error output to represent execution, at the screen, of the input action that is unavailable on the screen;
    executing the L* algorithm with respect to the GUI-based application using the observation table; and
    generating a deterministic finite-state machine model for the GUI-based application based on an output of the L* algorithm.

7. The method of claim 6, further comprising:
    performing a directed crawl of the GUI-based application in response to a query output by the L* algorithm, the directed crawl being configured to determine an additional set of input/output sequences of the GUI-based application;

modifying the observation table based on the additional set of input/output sequences; and
executing the L* algorithm with respect to the GUI-based application using the modified observation table.

8. The method of claim 7, wherein the additional set of input/output sequences includes an answer to the query and an input/output sequence unrelated to the query.

9. The method of claim 7, further comprising generating the query based on the observation table not being closed and consistent.

10. The method of claim 6, further comprising determining whether the deterministic finite-state machine model sufficiently models the GUI-based application.

11. The method of claim 10, further comprising:
generating a counter example of when the deterministic finite-state machine model does not sufficiently model the GUI-based application;
modifying the observation table based on the counter example; and
executing the L* algorithm with respect to the GUI-based application using the modified observation table.

12. A processor configured to execute computer instructions to cause a system to perform operations for modeling a graphical user interface (GUI) based application as a finite-state machine, the operations comprising:
generating a screen-based state in a finite-state machine, the screen-based state corresponding to a screen of a graphical user interface (GUI) based application;
generating a dummy error state and a dummy error output in the finite-state machine; and
modeling a response to an action that is unavailable on the screen of the GUI based application as a transition from the screen-based state to the dummy error state in the finite-state machine while producing the dummy error output in the finite-state machine.

13. The processor of claim 12, wherein the operations further comprise:
modeling an action on the screen as an input in the finite-state machine; and
modeling a subsequent screen, generated by the GUI-based application in response to the action performed on the screen, as an output in the finite-state machine.

14. The processor of claim 12, wherein the screen includes a collections field, the operations further comprising modeling the screen in the finite-state machine such that the collections field is associated with a first output in the finite-state machine when the collections field is empty and the collections field is associated with a second output in the finite-state machine when the collections field is populated.

15. The processor of claim 12, wherein the operations further comprise modeling a stack of the GUI-based application as a bounded stack that includes a finite number of configurations and modeling each of the configurations as part of the states in the finite-state machine using input/output sequences in the finite-state machine to distinguish between different configurations.

16. A processor configured to execute computer instructions to cause a system to perform operations for generating a deterministic finite-state model of a graphical user interface (GUI) based application, the operations comprising:
performing a crawl of a graphical user interface (GUI) based application to determine input/output sequences of the GUI-based application;
modeling, as a dummy input/output response, a response to an action that is unavailable on a screen of the GUI-based application, the dummy input/output response including a transition from a screen-based state that corresponds to the screen to a dummy error state and producing a dummy error output;
generating an observation table of an active learning algorithm ("L* algorithm") based on the dummy input/output response and based on the input/output sequences of the GUI-based application determined during the crawl;
executing the L* algorithm with respect to the GUI-based application using the observation table; and
generating a deterministic finite-state machine model for the GUI-based application based on an output of the L* algorithm, the deterministic finite-state machine model including a dummy error state and modeling the response to the action that is unavailable on the screen of the GUI-based application as a transition to the dummy error state and producing the dummy error output.

17. The processor of claim 16, wherein the operations further comprise:
performing a directed crawl of the GUI-based application in response to a query output by the L* algorithm, the directed crawl being configured to determine an additional set of input/output sequences of the GUI-based application;
modifying the observation table based on the additional set of input/output sequences; and
executing the L* algorithm with respect to the GUI-based application using the modified observation table.

18. The processor of claim 17, wherein the additional set of input/output sequences includes an answer to the query and an input/output sequence unrelated to the query.

19. The processor of claim 17, wherein the operations further comprise generating the query based on the observation table not being closed and consistent.

20. The processor of claim 16, wherein the operations further comprise determining whether the deterministic finite-state machine model sufficiently models the GUI-based application.

21. The processor of claim 20, wherein the operations further comprise:
generating a counter example of when the deterministic finite-state machine model does not sufficiently model the GUI-based application;
modifying the observation table based on the counter example; and
executing the L* algorithm with respect to the GUI-based application using the modified observation table.

* * * * *